(12) United States Patent
Laubry

(10) Patent No.: US 6,838,534 B2
(45) Date of Patent: Jan. 4, 2005

(54) CATALYTIC SYSTEM AND PROCESS FOR THE PREPARATION OF ELASTOMERS BY MEANS OF THIS SYSTEM

(75) Inventor: Philippe Laubry, Marsat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 43 days.

(21) Appl. No.: 10/435,582

(22) Filed: May 9, 2003

(65) Prior Publication Data

US 2004/0009870 A1 Jan. 15, 2004

Related U.S. Application Data

(63) Continuation of application No. PCT/EP01/12883, filed on Nov. 7, 2001.

(30) Foreign Application Priority Data

Nov. 9, 2000 (FR) .............................................. 00 14517

(51) Int. Cl.$^7$ ........................... C08F 4/54; C08F 136/08
(52) U.S. Cl. ........................ 526/153; 526/164; 526/290; 526/340.2; 526/335; 502/114; 502/108; 502/162
(58) Field of Search ................................. 526/164, 153, 526/290, 340.2, 335; 502/114, 108, 162

(56) References Cited

U.S. PATENT DOCUMENTS

| 3,794,604 A | 2/1974 | Throckmorton et al. ..... 252/431 |
| 3,864,278 A | 2/1975 | La Heij et al. ............. 252/429 |
| 4,128,708 A | 12/1978 | Liakumovich et al. ...... 526/162 |
| 5,859,156 A | 1/1999 | Calderon et al. ............. 526/64 |

FOREIGN PATENT DOCUMENTS

| EP | 0304088 | 2/1989 |
| EP | 0846707 | 6/1998 |
| JP | 6023406 | 2/1985 |

OTHER PUBLICATIONS

Report of the Academy of Sciences of the USSR, vol. 234, No. 5, 1977 (Y.B. Monakov, Y.R. Bieshev, A.A. Berg, S.R. Rafikov.
"Studies on coordination catalyst based on rare–earth compounds in stereospecific polymerization", Proceedings of China—U. S. Bilateral Symposium on Polymer Chemistry and Physics, Science Press, pp. 382–398, 1981 (O. Jun, W. Fosong, S. Zhiquan).

Quang Tho Pham, R. Petiaud, H. Waton, M.F. Llauro Darricades, "Proton and Carbon NMR Spectra of Polymers", 1991, Penton Press.

Y. Tanaka, Y. Takeuchi, M. Kobayashi, H. Tadokoro, "Characterization of Diene Polymers. I. Infrared and NMR Studies: Nonadditive Behavior of Characteristic Infrared Bands", Journal of Polymer Science, Part A–2, 1971, 9(1), 43–57.

J.P. Kistler, G. Friedman, B. Kaempf, Bulletin de la Société Chimique de France, 1967, No. 12., 4759–4764.

F. Assioma, J. Marchal, C. R. Acad. Sc. Paris, Ser C, 1968, 266(22), 1563–1566.

F. Assioma, J. Marchal, C. R. Acad. Sc. Paris Ser C, 1968, 266(6), 369–372.

T.F. Banigan, A.J. Verbiscar, T.A. Oda, "An infrared spectrophotometric analysis for natural rubber in guayule shrubs", Rubber Chemistry and Technology, 1982, 55(2), 407–415.

P. Geladi and B. R. Kowalski, "Partial Least–Squares regression: a tutorial", Analytica Chimica Acta, vol. 185, 1–17 (1986).

F. Ciampelli, D. Moreno, M. Cambini, "Some Remarks on the Infrared Analysis of Polyisoprenes", Makromol. Chem., 1963, 61, 250–253.

U.S. Application Ser. No. 10/437,330 filed May 12, 2003, Phillippe Laubry, "Synthetic isoprenes and a process for their preparation.".

*Primary Examiner*—Caixia Lu
(74) *Attorney, Agent, or Firm*—Burns, Doane, Swecker & Mathis, L.L.P.

(57) ABSTRACT

The present invention provides a catalytic system that can be used to prepare by polymerization diene elastomers comprising polyisoprenes and polybutadienes. The invention also provides a process for the preparation of the catalytic system and to a process using the catalytic system to prepare diene elastomers comprising polyisoprenes having a high cis-1,4 linkage content and polybutadienes. The catalytic system according to the invention is based on (a) a conjugated diene monomer, (b) an organic phosphoric acid salt of a rare earth metal, (c) an alkylating agent consisting of an alkylaluminium of the formula $AlR_3$ or $HAlR_2$, and (d) a halogen donor consisting of an alkylaluminium halide, and is such that said salt is suspended in at least one inert and saturated aliphatic or alicyclic hydrocarbon solvent and, the "alkylating agent:rare earth salt" molar ratio ranges from 1 to 5.

19 Claims, 2 Drawing Sheets

CATALYTIC SYSTEM AND PROCESS FOR THE PREPARATION OF ELASTOMERS BY MEANS OF THIS SYSTEM

This application is a Continuation of: PCT/EP01/12883 filed Nov. 7, 2001.

BACKGROUND OF THE INVENTION

The present application is a continuation of PCT/EP01/12883, filed on Nov. 7, 2001, now WO 02/38636 (published in French). The present invention relates to a catalytic system that can be used to prepare by polymerization, diene elastomers comprising polyisoprenes and polybutadienes to a process for the preparation of said catalytic system, and to a process for preparing diene elastomers comprising polyisoprenes having a high cis-1,4 linkage content and polybutadienes using the catalytic system.

It is known that polyisoprenes having a high cis-1,4 linkage content may be prepared using catalytic systems based on:

a rare earth salt in solution in a hydrocarbon solvent, an alkylating agent of this salt consisting of an alkylaluminium, and an alkylaluminium halide.

For example, the document "Report of the Academy of Sciences of the USSR, volume 234, no. 5, 1977 (Y. B. Monakov, Y. R. Bieshev, A. A. Berg, S. R. Rafikov), shows that isoprene may be polymerized using a catalytic system comprising:

a bis(2-ethylhexyl)phosphoric acid salt of neodymium or praseodymium, as the rare earth salt, in solution in toluene, triisobutylaluminium as the alkylating agent, in an "alkylating agent:rare earth salt" molar ratio of 20, and diethylaluminium chloride as the alkylaluminium halide.

Mention may also be made of the document, "Proceedings of China-U.S. Bilateral Symposium on Polymer Chemistry and Physics, Science Press, pp. 382–398, 1981 (O. Jun, W. Fosong, S. Zhiquan)". This document teaches the use of a bis(2-ethylhexyl)phosphoric acid salt of neodymium, in association with triethylaluminium or triisobutylaluminium, and an alkylaluminium halide of the formula $Al_2(C_2H_5)_3Cl_3$.

U.S. Pat. No. 3,794,604 exemplifies a catalytic system of the type which has been "preformed" in the presence of a conjugated diene monomer and comprising:

butadiene or isoprene as the conjugated diene monomer, cerium octanoate as the rare earth salt in solution in benzene, diisobutylaluminium hydride as the alkylating agent in an "alkylating agent:rare earth salt" molar ratio substantially equal to 20 and ethylaluminium dichloride as the alkylaluminium halide.

It will be noted that the only polymerization examples stated in this patent relate to the polymerization of butadiene.

Japanese patent specification JP-A-60/23406 also describes a catalytic system of the type which has been "preformed" in the presence of butadiene, the system specifically being intended for the polymerization of butadiene. The catalytic systems tested in the examples of embodiment of said document comprise:

a bis (2-ethylhexyl) phosphoric acid salt of neodymium as the rare earth salt in solution in n-hexane or cyclohexane, triisobutylaluminium or diisobutylaluminium hydride as the alkylating agent in an "alkylating agent:rare earth salt" molar ratio ranging from 10 to 30, and ethylaluminium sesquichloride as the alkylaluminium halide.

It will be noted that none of the polybutadienes, obtained by means of these catalytic systems, simultaneously exhibit a Mooney viscosity ML(1+4) at 100° C. greater than or equal to 40 and a polydispersity index of below 2.5. As a result, these polybutadienes are not suitable for use in a tire tread.

Another major drawback of these known catalytic systems is that they exhibit differing levels of activity for the polymerization of the various conjugated dienes, in particular for the homopolymerization of either isoprene or butadiene.

Another drawback is the non-reproducible nature of the macrostructural and microstructural properties exhibited by the polymers obtained by means of these catalytic systems, in particular with regard to the content of cis-1,4 linkages, which may vary significantly.

SUMMARY OF THE INVENTION

The present invention is based on the unexpected discovery that a catalytic system of the "preformed" type based on at least:

a conjugated diene monomer, an organic phosphoric acid salt of a rare earth metal (a metal with an atomic number between 57 and 71 in Mendeleev's periodic table), said salt being in suspension in at least one inert, saturated and aliphatic or alicyclic hydrocarbon solvent, an alkylating agent consisting of an alkylaluminium of formula $AlR_3$ or $HAlR_2$, the "alkylating agent:rare earth salt" molar ratio ranging from 1 to 5, and a halogen donor consisting of an alkylaluminium halide, makes it possible to overcome the above-mentioned drawbacks by exhibiting elevated activity for obtaining diene elastomers, such as polyisoprenes and polybutadienes, and in particular polyisoprenes which exhibit, on the one hand, a wide range of viscosities and, on the other hand, a high and reproducible cis-1,4 linkage content, substantially ranging from 98.0% to 98.5%.

The phrase "based on" used to define the constituents of the catalytic system is taken to mean the mixture and/or the reaction product of these constituents. Also, the phrase "a rare earth metal" is intended to mean "one or more rare earth metals."

Preferably, said "alkylating agent:rare earth salt" molar ratio ranges from 1 to 2. The corresponding catalytic system of the invention makes it possible to obtain polyisoprenes exhibiting the above-stated properties at a very high level of catalytic activity.

BRIEF DESCRIPTION OF THE DRAWINGS

The features of the present invention will be better understood on reading the following Detailed Description which provides several examples of embodiment of the invention and the attached drawings in which.

DETAILED DESCRIPTION OF THE INVENTION

Figure 1:
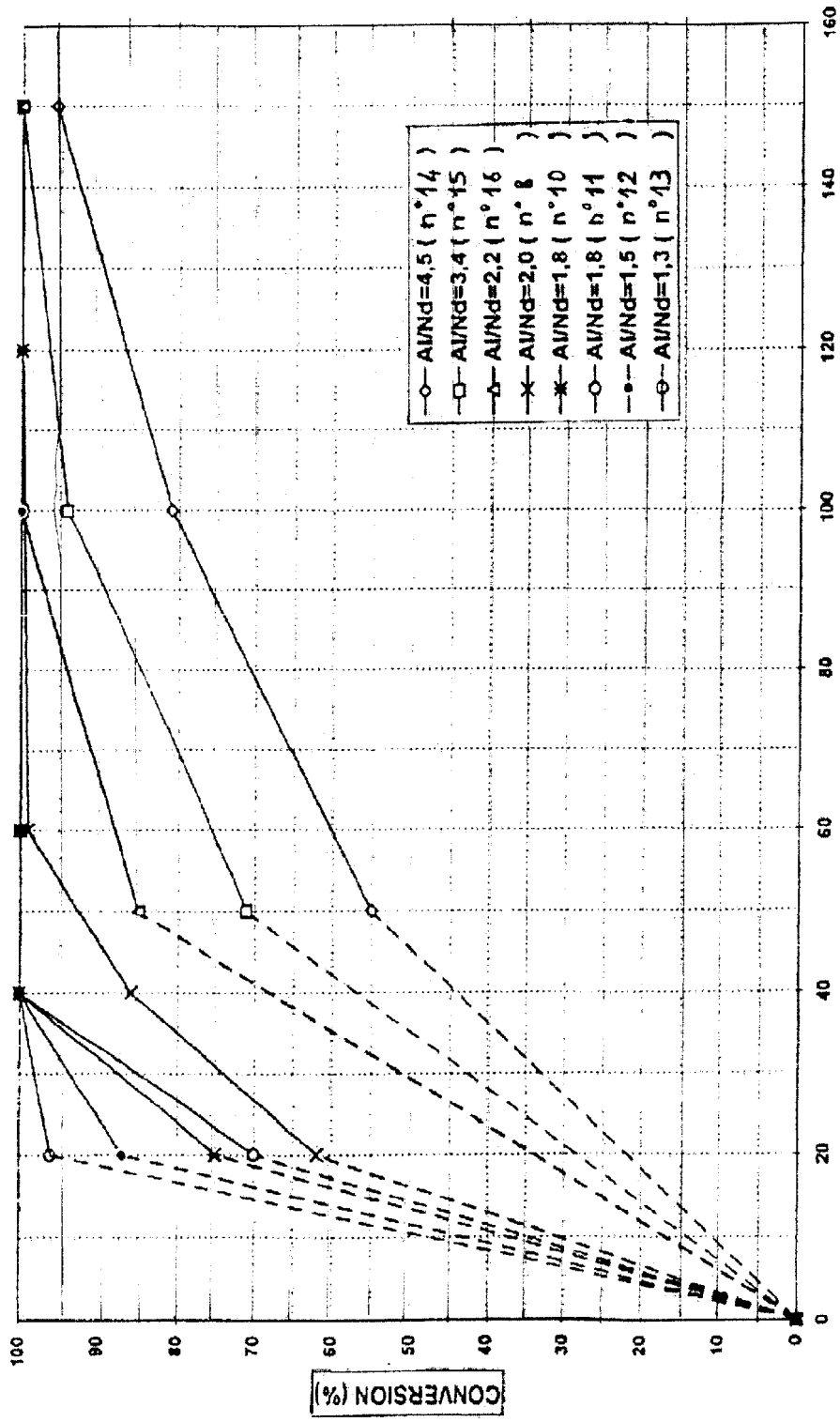
FIG. 1 is a graph illustrating the influence of the "alkylating agent:rare earth salt" molar ratio on the activity of 8 catalytic systems of the invention for the preparation of polyisoprenes exhibiting an identical inherent viscosity of approximately 4 dl/g.

The catalytic systems of the invention are characterized by an "alkylating agent:rare earth salt" molar ratio which is very low in comparison with the molar ratios greater than or equal to 10 or 20 which have heretofore been tested under practical conditions. The alkylating agent:rare earth salt molar ratios of about 1 to 2 surprisingly permits a significant increase in the activity of these catalytic systems catalytic systems for the production of polyisoprenes.

1,3-Butadiene may be mentioned as a preferred conjugated diene monomer used for "preforming" the catalytic system of the invention.

Other conjugated dienes that may be used are 2-methyl-1,3-butadiene (or isoprene), 2,3-di(C1 to C5 alkyl)-1,3-butadienes such as, for instance, 2,3-dimethyl-1,3-butadiene, 2,3-diethyl-1,3-butadiene, 2-methyl-3-ethyl-1,3-butadiene, phenyl-1,3-butadiene, 1,3-pentadiene, 2,4-hexadiene or any other conjugated diene having between 4 and 8 carbon atoms.

It will be noted that the "monomer:rare earth salt" molar ratio may have a value ranging from 25 to 50.

According to another characteristic of the invention, said rare earth salt consists of a non-hygroscopic powder having a slight tendency to agglomerate at ambient temperature.

According to a preferred embodiment of the invention, the inert hydrocarbon solvent in which said rare earth salt is suspended is a low molecular weight aliphatic or alicyclic solvent, such as cyclohexane, methylcyclohexane, n-heptane or a mixture of these solvents.

According to another embodiment of the invention, the solvent used to suspend the rare earth salt is a mixture of a high molecular weight aliphatic solvent comprising a paraffinic oil, for example petrolatum oil, and a low molecular weight solvent, such as those mentioned above (for example cyclohexane or methylcyclohexane).

This suspension is prepared by dispersive grinding of the rare earth salt in this paraffinic oil in such a manner so as to obtain a very fine and homogeneous suspension of the salt.

According to another characteristic of the invention, said catalytic system comprises the rare earth metal in a concentration equal to or substantially equal to 0.02 mol/l.

According to another characteristic of the invention, said catalytic system is such that said rare earth salt has a mass content of rare earth metal ranging from 12.0% to 13.5%, determined both by complexometric back titration with ethylenediaminetetraacetic acid (hereinafter "EDTA") and by inductively-coupled plasma atomic emission spectrometry (hereinafter "ICP-AES").

The catalytic systems of the invention are characterized by these rare earth metal contents, because the rare earth salts advantageously make it possible to obtain polybutadienes which simultaneously exhibit a Mooney viscosity ML(1+4) at 100° C., measured in accordance with Standard ASTM D 1646, which is greater than or equal to 40, and a polydispersity index, measured by size exclusion chromatography (SEC), which is less than 2.5. Such combined characteristics make these polybutadienes particularly suitable for use in tire treads.

Said rare earth salt preferably exhibits a mass content of rare earth metal ranging from 12.5% to 13.2%.

Advantageously, the polybutadienes obtained simultaneously exhibit a Mooney viscosity ML(1+4) at 100° C. of greater than 40 and a polydispersity index of less than 2.0.

According to a preferred embodiment of the invention, a tris[bis(2-ethylhexyl)phosphate] salt of the rare earth metal or metals is used as the salt.

Even more preferably, the rare earth salt is neodymium tris[bis(2-ethylhexyl)phosphate].

Alkylating agents that can be used in the catalytic system of the invention include alkylaluminiums such as:

trialkylaluminiums, for example triisobutylaluminium, or dialkylaluminium hydrides, for example diisobutylaluminium hydride.

It will be noted that this alkylating agent preferably consists of diisobutylaluminium hydride.

Halogen donors that can be used in the catalytic system of the invention include alkylaluminium halides, preferably diethylaluminium chloride.

The "halogen donor: rare earth salt" molar ratio has a value ranging from 2.2 to 3, preferably, from 2.6 to 3.

According to the invention, the process for the preparation of said catalytic system comprises:

(i) preparing a suspension of said rare earth salt in said solvent, (ii) adding said conjugated diene monomer to the suspension, (iii) adding said alkylating agent to the suspension comprising said monomer to obtain an alkylated salt, and (iv) adding said halogen donor to the alkylated salt.

In accordance with the invention, the process for preparing diene elastomers comprises in reacting said catalytic system in an inert hydrocarbon solvent and in the presence of the monomer or monomers to be polymerized, to obtain a diene elastomer which may be any homopolymer or copolymer obtained by homopolymerization or copolymerization of a conjugated diene monomer having 4 to 12 carbon atoms.

Suitable conjugated diene monomers are, in particular, 1,3-butadiene, isoprene, 2,3-di(C1 to C5 alkyl)-1,3-butadienes such as, for instance, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene.

The diene elastomer obtained by the polymerization process of the invention is characterized by a high cis-1,4 linkage content and may, for example, consist of a polyisoprene (IR) or a polybutadiene (BR).

Advantageously, when polymerization is carried out at a temperature ranging from 25° C. to 55° C., the process according to the invention makes it possible to obtain with elevated activity, polyisoprenes exhibiting a cis-1,4 linkage content, measured both by carbon 13 nuclear magnetic resonance and by infrared analysis, which falls within the range from 98.0% to 98.5% (disregarding a measurement inaccuracy of ±0.1% which is inherent to each of these two methods).

Furthermore, when polymerization is carried out at a temperature ranging from 25° C. to 100° C., the process according to the invention also makes it possible to obtain with elevated activity, polybutadienes which likewise exhibit a high cis-1,4 linkage content, together with an inherent viscosity, measured at a concentration of 0.1 g/dl in toluene, which is greater than 2 dl/g (the inherent viscosity being measured in accordance with Standard ASTM D 1646).

Advantageously said "alkylating agent:rare earth salt" molar ratio has a value ranging from 1 to 2, in order to obtain polybutadienes with improved catalytic activity having a cis-1,4 linkage content, measured by near infrared (NIR) analysis, of between 98.0% and 99.0%.

See "Measurements and Tests" below for a description of the NIR method used.

The following examples are provided to illustrate the present invention, but are not intended to limit the same.

EXAMPLE I

PREPARATION OF CATALYTIC SYSTEMS OF THE INVENTION

1) Synthesis of an Organic Phosphate Salt of Neodymium of the Invention:

A plurality of tests were carried out for synthesis of this salt. The same synthesis method, which is described in detail below, was used for each of these tests.

a) Synthesis of an Aqueous Solution of Neodymium $NdCl_3, 6H_2O$:

96 g of $Nd_2O_3$ (sold by RHODIA), which has been determined by complexation analysis to have an Nd content of 85.3% (theoretical value 85.7%), thereby amounting to 0.57 mol of Nd, was weighed out into a "tall" form 600 ml beaker.

80 ml of demineralized water were added. Under a fume hood, 150 ml of 36 wt. % concentrated HCl (d=1.18), namely 1.75 mol of HCl (molar ratio HCl:Nd=1.75:0.57= 3.07), were slowly added at ambient temperature while the mixture was stirred with a magnetic stirrer.

The reaction $Nd_2O_3 + 6\ HCl + 9\ H_2O \rightarrow 2\ NdCl_3, 6H_2O$ is highly exothermic.

Once all the hydrochloric acid has been added, the solution was raised to boiling while being stirred with a magnetic stirrer. The aqueous $NdCl_3$ solution was clear and mauve in color. No insoluble product ($Nd_2O_3$) remained.

This solution was then evaporated until a volume of 130 ml remained in the beaker. The $NdCl_3, 6H_2O$ was highly concentrated (it crystallized at ambient temperature).

The concentrated solution of $NdCl_3$ was then poured into a 10 liter drum containing 4500 ml of demineralized water at ambient temperature, while the mixture was stirred (using a motor with an anchor agitator).

The pH of the solution, measured at 25° C., was close to 4.

1500 ml of technical grade acetone were then added to the solution. No insoluble product remained and the resultant solution was pink in color.

b) Synthesis of an Organic Sodium Phosphate of Formula $[RO]_2P(O)ONa$ (R=2-Ethylhexyl):

68 g, or 1.70 mol, of NaOH flakes were dissolved in a 5 liter beaker containing 1500 ml of demineralized water. 554 g of an organic phosphoric acid (bis(2-ethylhexyl) phosphoric acid, listed in the "Aldrich" catalogue under number 23,782-5), namely 1.72 mol of this acid, were dissolved in another 3 liter beaker containing 500 ml of acetone. The molar ratio NaOH:organic phosphoric acid was 1.70:1.72 or 0.99.

At ambient temperature and while stirring the mixture by hand with a glass stirrer, the solution of said organic phosphoric acid was poured into the NaOH solution. The reaction is as follows:

$[RO]_2P(O)OH + NaOH \rightarrow [RO]_2P(O)ONa + H_2O$.

The reaction is slightly exothermic and a homogeneous solution of a yellowish color was obtained. The pH of the solution, measured at 25° C., was close to 7.

c) Synthesis of a Phosphated Neodymium Salt of the Formula $[[RO]_2P(O)O]_3Nd$:

At ambient temperature and while the mixture was being vigorously stirred (motor with anchor agitator), the organic Na phosphate salt obtained in paragraph b) above was poured into the aqueous solution of $NdCl_3, 6H_2O$ obtained in paragraph a) above.

A very fine white precipitate formed immediately. Stirring of the resultant mixture was continued for 30 minutes once all the organic Na phosphate had been added (in a molar ratio $(RO)_2P(O)ONa:NdCl_3=1.70:0.57=2.98$). The reaction is as follows:

$3\ [RO]_2P(O)ONa + NdCl_3, 6H_2O \rightarrow Nd[OP(O)[OR]_2]_3 + 3\ NaCl + 6\ H_2O$ The resultant phosphated neodymium salt was recovered and washed in a centrifuge equipped with a "sock".

The pH of the mother liquors was between 3 and 4 at 25° C. These mother liquors were colorless and clear.

The salt obtained was divided into two samples, then each sample was washed with an acetone/demineralized water mixture, performing the washing cycle described below three times in order to remove all the chlorides.

Each washing cycle was performed in a 10 liter plastic bucket initially containing 2 liters of acetone. Each sample was then homogenized with the acetone using an "Ultra-Turrax" homogenizer for approximately 1 minute in order to obtain a milky solution.

4 liters of demineralized water were then added to the bucket and the resultant mixture was homogenized for 3 minutes using the same homogenizer.

The resultant mixture was centrifuged and the phosphated neodymium salt was recovered in the "sock".

The qualitative analytic test for chlorides was virtually negative for the final washing water (the reaction is as follows:

$NaCl + AgNO_3$ ($HNO_3$ medium) $\rightarrow AgCl \downarrow + NaNO_3$)

The neodymium salt washed in this manner is dried in an oven under a vacuum and with air-flow for approximately 80 hours.

The final yield for each of the synthesis tests performed was between 95% and 98%, depending upon the losses arising during washing. In each case, approximately 600 g of dry phosphated neodymium salt was obtained.

The mass contents of neodymium, determined both by complexometric back titration with ethylenediaminetetraacetic acid (EDTA) and by inductively-coupled plasma atomic emission spectrometry (ICP-AES), were substantially between 12.5% and 12.8% (with a theoretical content τ of 13.01% where τ=[144.24/1108.50]×100, where 144.24 g/mol=molar mass of neodymium).

For each of these two methods, the neodymium content measurements were performed after wet acid mineralization of the salt, either in a sand bath in an open system or in a microwave oven in a closed system.

The complexometric back titration with EDTA involved back titration with complexation of neodymium with an excess of EDTA (ethylenediaminetetraacetic acid), in which the excess EDTA is determined at pH=4.6 with zinc sulphate.

A colored indicator was used with photometric detection of the equivalence point.

Inductively-coupled plasma atomic emission spectrometry is an elemental analytical method based on the observation of the radiation emitted by atoms raised to an excited state in a plasma.

The emitted radiation used for analysis of neodymium corresponds to wavelengths of 406.109 nm and 401.225 mn.

This spectrometric method was implemented by previously calibrating the system with "control" neodymium salts having a known neodymium content.

The following Table I shows the Nd contents obtained by means of these two methods (the number of tests performed on each salt sample is shown in brackets).

TABLE I

| Salt samples analysed | Percentage Nd content by complexometric titration | Percentage Nd content by ICP/AES | Relative deviation between the 2 methods |
| --- | --- | --- | --- |
| Phosphated Nd salt [[RO]$_2$P(O)O]$_3$Nd | 12.8 (9) | 12.8 (3) | 0% |
| Phosphated Nd salt [[RO]$_2$P(O)O]$_3$Nd | 12.8 (4) | 12.6 (3) | 1.6% |
| Phosphated Nd salt [[RO]$_2$P(O)O]$_3$Nd | 12.7 (6) | 12.2 (4) | 4% |
| Phosphated Nd salt [[RO]$_2$P(O)O]$_3$Nd | 12.6 (6) | 12.5 (4) | 0.8% |
| Nd acetylacetonate "control" | 31.7 (6) | 32.4 (4) | 2.2% |
| Nd oxalate "control" | 37.7 (3) | 38.0 (3) | 0.8% |

The results obtained by the two methods were comparable (relative deviation <4%).

2) Synthesis of Preformed Catalytic Systems: "control" and According to the Invention:

a) Composition of "Control" Catalytic Systems t and t':

"Control" catalytic system t was based on:

butadiene as the conjugated diene monomer, neodymium octoate as the rare earth salt, diisobutylaluminium hydride (hereafter DiBAH) as the alkylating agent, and diethylaluminium chloride (hereafter DEAC) as the halogen donor.

This catalytic system t was characterized by the following relative molar ratios, with respect to the neodymium salt:

Nd octoate:butadiene:DiBAH:DEAC=1:30:1.8:2.6

"Control" catalytic system t' differed from said catalytic system t solely in that it comprised neodymium acetylacetonate instead of neodymium octoate as the rare earth salt (the relative molar ratios with respect to the neodymium salt being identical).

In these two catalytic systems t and t', the neodymium salt was suspended in a low molecular weight hydrocarbon solvent consisting of methylcyclohexane.

b) Composition of Catalytic Systems 1 to 29 According to the Invention:

Each of these systems 1 to 29 comprises a phosphated neodymium salt as synthesized according to paragraph 1) above.

A first series of catalytic systems according to the invention (hereafter systems 1 to 13 and 27 to 29) was such that the phosphated neodymium salt was suspended in a low molecular weight hydrocarbon solvent (consisting of methylcyclohexane, n-heptane or cyclohexane).

A second series of catalytic systems according to the invention (hereafter systems 14 to 26) was such that the phosphated neodymium salt was suspended in a mixture of two inert hydrocarbon solvents, one of low molecular weight and the other of high molecular weight (mixture of "Prolabo" petrolatum oil, "Rectapur" grade, and cyclohexane or methylcyclohexane).

Suspension in the mixture of these two solvents was achieved by first carrying out dispersive grinding of the phosphated neodymium salt for 1 minute in said oil by means of an "Ultra-Turrax" homogenizer in order to obtain a very fine, homogeneous and relatively stable suspension (it being several days before the onset of any settling of the solid could be observed). Sampling of the mixture was thus facilitated.

Next, the cyclohexane or methylcyclohexane was added to the suspension obtained, thereby substantially raising viscosity and possibly resulting in the formation of a gel of greater or lesser fluidity.

Catalytic systems 1 to 29 according to the invention were characterized by the following relative molar ratios, with respect to the neodymium salt:

Octoate:butadiene:DiBAH:DEAC=1:25-5:1.3-4.5:2.6 or 3 c) Common Synthesis Method for "Control" Catalytic Systems and Those According to the Invention:

First Stage:

With the aim of obtaining catalytic systems t, t', 1 to 13 and 27 to 29, 15.6 g of the neodymium salt in powder form were poured into a 1 liter reactor from which the impurities had previously been removed. This salt was then subjected to nitrogen bubbling from the bottom of the reactor for a period of 15 minutes.

With the aim of obtaining catalytic systems 14 to 26, the phosphated neodymium salt was suspended as described above in the petrolatum oil in a mass fraction of 10% for said salt. This suspension of the salt was then subjected to nitrogen bubbling for a period of 5 minutes. The resultant suspension was then poured into a reactor identical to the previous one, from which the impurities had been improved and which had been placed under a nitrogen atmosphere.

Second Stage:

90% (mass fraction) of the solvent mentioned in paragraphs a) and b) above were introduced into the reactor containing the neodymium salt, this solvent being methylcyclohexane for synthesis of catalytic systems t and t', methylcyclohexane or n-heptane for catalytic systems 1 to 13 and 29, and cyclohexane or methylcyclohexane for catalytic systems 14 to 28.

The period and temperature at which this solvent and the neodymium salt were brought into contact were respectively 30 minutes and 30° C. for catalytic systems t, t', 1 to 13 and 29, 4 hours and 60° C. for catalytic systems 14 to 27 and 2 hours and 60° C. for catalytic system 28.

Third Stage:

Butadiene was then introduced into the reactor (in the molar ratios already stated in paragraphs a) and b) above) at a temperature of 30° C. with the aim of "preforming" each catalytic system.

Fourth Stage:

Diisobutylaluminium hydride (DiBAH) was then introduced into the reactor as the alkylating agent for the neodymium salt in a concentration of approximately 1 M, together with a quantity of the solvent already stated in the second stage corresponding to a mass fraction of 5% of the entire quantity of said solvent. The alkylation time was 15 minutes for catalytic systems t, t', 1 to 9, 14 to 28 and 30 minutes for the other catalytic systems 10 to 13 and 29 (see paragraph II below). The temperature of the alkylation reaction was 30° C.

Fifth Stage:

Diethylaluminium chloride (DEAC) was then introduced into the reactor as the halogen donor in a concentration of approximately 1 M, together with a quantity of the solvent already stated in the second stage corresponding to a remaining mass fraction of 5% of the entire quantity of said solvent. The temperature of the reaction medium was adjusted to 60° C.

Sixth Stage:

The resultant mixture was then "preformed" (or aged) by maintaining this temperature of 60° C. for a period of 120 minutes, with the exception of catalytic system 11 where the temperature was maintained for only 60 minutes (see paragraph II).

Seventh Stage:

In this manner, approximately 700 ml of a solution of catalytic system t, t' or 1 to 29 were obtained. The reactor was emptied and the contents transferred into a 750 ml "Steinie" bottle, which had been previously washed, dried and subjected to nitrogen bubbling.

Finally, the catalytic solution was stored under a nitrogen atmosphere in a freezer at a temperature of −5° C.

EXAMPLE II

POLYMERIZATION OF ISOPRENE BY MEANS OF CATALYTIC SYSTEMS T, T' AND 1 TO 16

1) Operating Method for the Various Polymerizations:

A 250 ml "Steinie" bottle was used as the polymerization reactor (except for the second and third polymerization examples using catalytic system 5, where a 750 ml "Steinie" bottle was used, see Table II below). Each polymerization reaction was carried out by subjecting this bottle to agitation in a water tank.

A steam-cracked C5 naphtha fraction was used with the aim of extracting isoprene therefrom with a purity approaching 100%. To this end, a conventional laboratory purification process was used comprising the following successive steps:

distillation of this C5 fraction over maleic anhydride to eliminate any residual cyclopentadiene, followed by passage through an alumina column to remove polar impurities, and nitrogen bubbling for 20 minutes, immediately prior to the polymerization reaction.

The mass fraction of isoprene extracted from this C5 fraction was determined at 99.2% by gas phase chromatography (GPC).

Each isoprene polymerization reaction (10 g of isoprene is used per bottle, except for the second and third examples with catalytic system 5, where 36 g of isoprene were used) was carried out in cyclohexane at 50° C. (the temperature was 30° C. for said third example with catalytic system 5) and under an inert atmosphere (nitrogen). A "polymerization solvent (cyclohexane):monomer (isoprene)" mass ratio of 9 was used (said mass ratio is hereafter denoted "S:M").

The quantity of neodymium catalyst base ranged from 90 μmol to 600 μmol per 100 g of isoprene, depending upon the test performed (this quantity is stated in μMcm in Table II below). It will be noted that this quantity of neodymium was adjusted on the basis of the "alkylating agent:rare earth salt" ratio with the aim of obtaining final inherent viscosity values which were substantially identical for the polyisoprenes obtained.

Tightness of the bottle was ensured by a "septum/open-top seal" assembly which permitted addition of each catalytic system using a syringe.

Acetylacetone was used in a volume of 1 ml as a polymerization reaction shortstopping agent and N-1,3-dimethylbutyl-N'-phenyl-phenylenediamine (6PPD) as a protection agent (in a volume of 2 ml at a concentration of 10 g/l in cyclohexane, giving a mass of 0.02 g).

The polyisoprene was then extracted from the resultant polymer solution by steam stripping for 30 minutes in the presence of calcium tamolate (using 2 ml of tamol and 50 ml of $CaCl_2$ at 30 g/l). This extracted solution was then dried for approximately 18 hours in an oven at 60° C. under a vacuum (at a pressure of 200 mm of Hg), under a gentle stream of nitrogen.

The conversion rate of isoprene to polyisoprene as a function of reaction time was measured to describe the polymerization kinetics.

As for inherent viscosity $\eta_{inh}$ at 0.1 g/dl in toluene, this parameter characterizes the macrostructure of each polyisoprene obtained.

2) Details of Polymerization Reactions Carried Out by Means of Each Catalytic System, the "Controls" t, t' and 1 to 16 According to the Invention:

The Table II provides details of:

the characteristics of each catalytic system used in terms of:

solvation conditions (solvent(s) used, contact time and temperature); CH=cyclohexane, MCH=methylcyclohexane, "preforming monomer (in this case butadiene, abbreviated to Bd):rare earth salt (abbreviated to Nd)" molar ratio, "alkylating agent (Al):rare earth salt (Nd)" molar ratio, alkylating conditions (time and temperature T), molar ratio "halogen donor (Cl):rare earth salt (Nd)", preforming or aging conditions (time and temperature T);

characteristics of each polymerization reaction performed in terms of:

quantity of neodymium catalytic base used (Nd in μMcm),

S:M mass ratio (cyclohexane solvent:monomer polymerized) and polymerization temperature T, conversion rate (abbreviated to conv. rate) corresponding to determined reaction times; and the characteristics of various of the polyisoprenes obtained in terms of:

inherent viscosity $\eta_{inh}$ and Mooney viscosity ML (1+4) at 100° C. (measured in accordance with Standard ASTM: D-1646), number-average molecular weight Mn and polydispersity index Ip, measured by size exclusion chromatography (SEC). (See "Measurements and Tests" below.)

content of cis-1,4 linkages, measured by carbon 13 nuclear magnetic resonance ($^{13}C$ NMR) and by mid-infrared (MIR) analysis, which methods are respectively indicated "*" and "***" in the following tables. (See "Measurements and Tests" below for methods used.)

TABLE II

| | Catalytic system | | | | | | Polymerization | | | Polyisoprene obtained | | | |
|---|---|---|---|---|---|---|---|---|---|---|---|---|---|
| | Solvation (solvent/ time/T) | Bd:Nd mol | Al:Nd mol | Alkylation time/T | Cl:Nd mol | Pre- forming time/T | Nd μMcm | S:M T | Reaction time (min.) | Conv. rate (%) | $\eta_{inh}$ dl/g | ML (1 + 4) at 100° C. | Mn (g/mol) Ip (SEC) | Cis-1,4 (%) |
| t | MCH 30 min. 30° C. | 30 | 1.8 | 15 min. 30° C. | 2.6 | 2 hours 60° C. | 300 | 9 50° C. | 20 40 60 120 | 0 0 0 0 | | | | |
| t' | MCH 30 min. 30° C. | 30 | 1.8 | 15 min. 30° C. | 2.6 | 2 hours 60° C. | 300 | 9 50° C. | 20 40 60 120 | 0 0 0 0 | | | | |
| 1 | MCH 30 min. 30° C. | 50 | 2.0 | 15 min. 30° C. | 3.0 | 2 hours 60° C. | 260 | 9 50° C. | 20 40 60 120 | 57 86 98 100 | 3.98 4.04 | | | 98.0** |
| 2 | n-heptane 30 min. 30° C. | 50 | 2.0 | 15 min. 30° C. | 3.0 | 2 hours 60° C. | 260 | 9 50° C. | 20 40 60 120 | 59 89 100 100 | 3.87 3.89 | | | 98.0** |
| 3 | MCH 30 min. 30° C. | 50 | 1.8 | 15 min. 30° C. | 2.6 | 2 hours 60° C. | 250 | 9 50° C. | 20 40 60 120 | 60 87 99 100 | 4.14 4.28 | | | 98.1* 98.0** |
| 4 | MCH 30 min. 30° C. | 50 | 1.8 | 15 min. 30° C. | 2.6 | 2 hours 60° C. | 300 | 9 50° C. | 20 40 60 120 | 66 92 99 100 | 4.36 4.36 4.48 | | 425000/2.17 | 98.0** |
| 5 (1) | MCH 30 min. 30° C. | 25 | 1.8 | 15 min. 30° C. | 2.6 | 2 hours 60° C. | 300 | 9 50° C. | 20 40 60 120 | 67 90 100 100 | 4.14 4.29 | | 443000/2.25 | 98.1** |
| 5 (2) | MCH 30 min. 30° C. | 25 | 1.8 | 15 min. 30° C. | 2.6 | 2 hours 60° C. | 240 255 260 285 315 345 | 9 50° C. | 120 | 100 | 4.40 4.50 4.30 4.15 4.10 3.80 | 83 81 80 76 71 66 | 490000/2.10 | 98.0** 97.9** 98.0** 98.0** 98.0** 98.0** |
| 5 (3) | MCH 30 min. 30° C. | 25 | 1.8 | 15 min. 30° C. | 2.6 | 2 hours 60° C. | 375 450 460 495 540 600 | 9 30° C. | 120 | 100 | 5.00 4.60 4.60 4.40 4.20 4.10 | 89 81 80 76 72 65 | 457000/2.28 | 98.4** 98.5** 98.4** 98.4** 98.4** 98.4** |
| 6 | MCH 30 min. 30° C. | 30 | 1.8 | 15 min. 30° C. | 2.6 | 2 hours 60° C. | 300 | 9 50° C. | 20 40 60 120 | 68 96 100 100 | 4.49 4.46 | | | 98.0** |
| 7 | n-heptane 30 min. 30° C. | 30 | 1.8 | 15 min. 30° C. | 2.6 | 2 hours 60° C. | 300 | 9 50° C. | 20 40 60 120 | 65 95 100 100 | 4.84 4.83 | | | 98.1** |
| 8 | MCH 30 min. 30° C. | 50 | 2.0 | 15 min. 30° C. | 3.0 | 2 hours 60° C. | 245 | 9 50° C. | 20 40 60 120 | 62 86 99 100 | 3.88 3.90 | | | 98.0** |
| 9 | MCH 30 min. 30° C. | 50 | 1.8 | 15 min. 30° C. | 3.0 | 2 hours 60° C. | 200 | 9 50° C. | 20 40 60 120 | 52 81 92 100 | 3.99 4.31 | | | 98.0** |
| 10 | MCH 30 min. 30° C. | 30 | 1.8 | 30 min. 30° C. | 2.6 | 2 hours 60° C. | 380 | 9 50° C. | 20 40 60 120 | 75 100 100 100 | 4.30 4.27 | | | 98.0** |
| 11 | MCH 30 min. 30° C. | 30 | 1.8 | 30 min. 30° C. | 2.6 | 1 hours 60° C. | 270 | 9 50° C. | 20 40 60 120 | 70 100 100 100 | 4.31 4.25 | | | 98.1** |
| 12 | MCH 30 min. 30° C. | 30 | 1.5 | 30 min. 30° C. | 2.6 | 2 hours 60° C. | 540 | 9 50° C. | 20 40 60 120 | 87 100 100 100 | 4.35 4.30 | | | 98.1** |
| 13 | MCH 30 min. 30° C. | 30 | 1.3 | 30 min. 30° C. | 2.6 | 2 hours 60° C. | 760 | 9 50° C. | 20 40 60 120 | 96 100 100 100 | 4.33 4.39 | 80 | | 98.1** |

TABLE II-continued

| | Catalytic system | | | | | Polymerization | | | | Polyisoprene obtained | | |
|---|---|---|---|---|---|---|---|---|---|---|---|---|
| Solvation (solvent/ time/T) | Bd:Nd mol | Al:Nd mol | Alkylation time/T | Cl:Nd mol | Pre- forming time/T | Nd µMcm | S:M T | Reaction time (min.) | Conv. rate (%) | $\eta_{inh}$ dl/g | ML (1 + 4) at 100° C. | Mn (g/mol) Ip (SEC) | Cis-1,4 (%) |
| 14 Oil, CH 4 hours 60° C. | 50 | 4.5 | 15 min. 30° C. | 3.0 | 2 hours 60° C. | 90 | 9 50° C. | 50 100 150 | 55 81 95.5 | 3.87 | | | 98.0** |
| 15 Oil, CH 4 hours 60° C. | 50 | 3.4 | 15 min. 30° C. | 3.0 | 2 hours 60° C. | 110 | 9 50° C. | 50 100 150 | 71 94 100 | 3.89 | | | 98.0** |
| 16 Oil, CH 4 hours 60° C. | 50 | 2.2 | 15 min. 30° C. | 3.0 | 2 hours 60° C. | 160 | 9 50° C. | 50 100 150 | 85 100 100 | 3.88 | | | 98.0** |

By way of indication, at a cis-1,4 linkage content of 98.1% in the polyisoprene, which was measured by $^{13}$C NMR (indicated "*" above), the same method was used to measure trans-1,4 and -3,4 linkage contents of 0.2% and 1.7%, respectively (the content of 1,2 linkages being zero).

3) Conclusions:

The polymerization examples using "control" catalytic systems t and t' showed that a catalytic system characterized by an Al:Nd molar ratio of between 1 and 2, using a salt consisting of neodymium octoate or neodymium acetylacetonate instead of a rare earth salt according to the invention, such as neodymium tris[bis(2-ethylhexyl)phosphate], imparts zero activity for isoprene polymerization to the corresponding catalytic system.

The polymerization examples using the catalytic systems according to the invention show that the catalytic activities achieved with Al:Nd molar ratios of between 1 and 2 (see in particular catalytic systems 3 to 7 and 9 to 13) are particularly high. In fact, for all these catalytic systems, 100% isoprene conversion was achieved after approximately 60 minutes with a final inherent viscosity of, on average, between 4 and 4.5 dl/g.

At a given inherent viscosity of the order of 4 dl/g for the polyisoprenes (at 100% conversion), it will be noted that catalytic activity rose when the Al:Nd molar ratio fell, as is shown by FIG. 1, which relates to the preparation of polyisoprenes by means of catalytic systems 8 and 10 to 16.

It will be noted in particular that catalytic system 13, which is characterized by an Al:Nd molar ratio of 1.3, constitutes a preferred embodiment of the invention, in that it allowed a conversion rate of 96% to be achieved in 20 minutes and a final inherent viscosity of approximately 4.4 dl/g with a polyisoprene exhibiting a cis-1,4 linkage content of 98%.

It will be noted that the reproducibility of the activity of the catalytic systems according to the invention is excellent, despite the possible variation with regard to the quality of the isoprene and solvent used.

It will also be noted that the polyisoprenes obtained exhibited substantially the same macrostructural and microstructural features (in particular cis-1,4 content of 98%), despite the variation in the quantity of catalytic base (Nd) and in the butadiene:Nd molar ratio.

In particular, the tests performed with catalytic systems 3 to 6 show that the values of said latter ratio (ranging from 25 to 50) had no significant influence upon activity and the above-mentioned characteristics.

It will be noted that the polyisoprenes obtained by means of the catalytic systems according to the invention exhibited particularly low polydispersity indices. By way of example, the polyisoprenes obtained by means of catalytic system 5 after said tests (1), (2) and (3) exhibited polydispersity indices ranging between 2.1 and 2.3.

Catalytic systems 14 to 16, which comprised a mixture of an oil and cyclohexane as solvent, exhibited activities which were relatively close to those of catalytic systems 1 to 13, which comprised a single alicyclic solvent, such as methylcyclohexane (independently of the quantity of Nd catalytic base).

As can be seen for the polymerizations performed by means of catalytic systems 10 to 13, which are characterized by an Al:Nd ratio of below 2, it will be noted that achieving optimum catalytic activity entailed reacting the rare earth salt with the alkylating agent for a longer period (30 min. instead of 15 min. at 30° C.) and reducing the Cl:Nd ratio (from a value of 3 for catalytic systems characterized by an Al:Nd ratio of greater than or equal to 2, to a value of 2.6).

In the light of the results achieved by catalytic systems 10 and 11, it will be noted that preforming conditions (temperature and time) had no effect on catalytic activity, with polymerization kinetics being substantially identical at a given Al:Nd ratio (of 1.8) for identical viscosity (it being essential to adjust the quantity of Nd).

In general, it will be noted that the cis-1,4 linkage content depends upon polymerization temperature (see third polymerization example using catalytic system 5, characterized by a polymerization temperature of 30° C., which yielded a cis-1,4 linkage content of about 98.4 or 98.5% in the polyisoprene obtained which are higher than those achieved at a polymerization temperature of 50° C. using this catalytic system 5).

EXAMPLE III

POLYMERIZATION OF BUTADIENE USING CATALYTIC SYSTEMS 14 TO 29

1) Operating Method for the Various Polymerizations:

A 250 ml "Steinie" bottle was used as the polymerization reactor. Each polymerization reaction was carried out by subjecting this bottle to agitation in a water tank.

Each butadiene polymerization reaction (10 g of butadiene were used per bottle) was performed in cyclohexane at 30° C., 50° C. or 60° C. under an inert atmosphere (nitrogen). A "polymerization solvent (cyclohexane):monomer (butadiene)" mass ratio of 7 or 9 was used (said mass ratio is hereafter denoted "S:M").

The quantity of neodymium catalyst base ranged from 250 µmol to 2000 µmol per 100 g of butadiene, depending upon the test performed (this quantity is stated in µMcm in Table III below). It will be noted that this quantity of neodymium was adjusted on the basis of the "alkylating agent:rare earth salt" ratio with the aim of obtaining final inherent viscosity values which were substantially identical for the polybutadienes obtained.

Tightness of the bottle was ensured by a "septum/open-top seal" assembly which permitted addition of each catalytic system using a syringe.

Acetylacetone was used in a volume of 1 ml to shortstop the polymerization reactions corresponding to catalytic systems 14 to 20 and in an acetylacetone:neodymium molar ratio of 21 to shortstop the reactions corresponding to catalytic systems 28 and 29.

Methanol was used to shortstop the polymerization reactions corresponding to catalytic systems 21 to 27.

N-1,3-dimethylbutyl-N'-phenyl-p-phenylenediamine (6PPD) was used as a protection agent (in a mass of 0.5 g) and, in the case of the polymer solution obtained with catalytic system 28, 6PPD was used in a quantity of 0.2 phr in association with 0.2 phr of a protection agent designated "AO2246".

The polybutadienes were then extracted from the polymer solutions thus obtained by steam stripping in the presence of calcium tamolate following the example of the polyisoprenes prepared in Example II.

Drying was performed for approximately 18 hours in an oven at 60° C. under a vacuum (at a pressure of 200 mm of Hg), under a gentle stream of nitrogen.

The conversion rate of butadiene to polybutadiene as a function of reaction time was measured to describe the polymerization kinetics.

As for inherent viscosity $\eta_{inh}$ at 0.1 g/dl in toluene, this parameter characterises the macrostructure of each polybutadiene obtained.

2) Details of Polymerization Reactions Carried Out by Means of Each Catalytic System, 14 to 29 According to the Invention:

As in Example II, the following Table III provides details of each catalytic system used, each polymerization reaction performed and the polybutadienes obtained in terms of:

TABLE III

| | Catalytic system | | | | | | Polymerization | | | | Polybutadienes | | |
|---|---|---|---|---|---|---|---|---|---|---|---|---|---|
| No. | Solvation (solvent/ time/T) | Bd:Nd mol | Al:Nd mol | Alkylation time/T | Cl:Nd mol | Preforming time/T | Nd μMcm | S:M T | Reaction time (min.) | Conv. rate (%) | $\eta_{inh}$ dl/g | Mn (g/mol) Ip (SEC) | Cis-1,4 (%) |
| 14 | Oil, CH 4 hours 60° C. | 50 | 4.5 | 15 min. 30° C. | 3 | 2 hours 60° C. | 250 | 7 30° C. | 15 25 35 47 | 38 71 86 100 | — — 2.57 2.71 (*) 2.77 (**) | 185000 1.42 | 98.9 |
| 15 | Oil, CH 4 hours 60° C. | 50 | 3.4 | 15 min. 30° C. | 3 | 2 hours 60° C. | 350 | 7 30° C. | 7 15 22 32 | 25 67.5 93 100 | — — 2.54 2.68 (*) 2.80 (**) | 185000 1.44 | 98.1 |
| 16 | Oil, CH 4 hours 60° C. | 50 | 2.2 | 15 min. 30° C. | 3 | 2 hours 60° C. | 560 | 7 30° C. | 5 9 13 17 | 34.5 71 94 100 | — — 2.52 2.57 (*) 2.68 (**) | 178000 1.44 | 97.7 |
| 17 | Oil, CH 4 hours 60° C. | 50 | 4 | 15 min. 30° C. | 3 | 2 hours 60° C. | 250 | 9 50° C. | 8 11 14 | 73 94 100 | 2.36 2.72 2.87 | 194000 1.76 | 96.2 |
| 18 | Oil, CH 4 hours 60° C. | 50 | 4 | 15 min. 30° C. | 3 | 2 hours 60° C. | 250 | 9 50° C. | 8 11 14 | 73 96.5 100 | 2.34 2.68 2.81 | 185000 1.63 | 95.7 |
| 19 | Oil, CH 4 hours 60° C. | 50 | 4 | 15 min. 30° C. | 3 | 2 hours 60° C. | 250 | 9 50° C. | 8 11 14 | 78 95 100 | 2.41 2.75 2.84 | 185000 1.65 | 96.4 |
| 20 | Oil, CH 4 hours 60° C. | 50 | 4 | 15 min. 30° C. | 3 | 2 hours 60° C. | 250 | 9 50° C. | 8 11 14 | 76.5 97 100 | 2.50 2.73 2.82 | 189000 1.63 | 95.7 |
| 21 | Oil, CH 4 hours 60° C. | 50 | 4 | 15 min. 30° C. | 3 | 2 hours 60° C. | 300 | 9 30° C. | 11 20 30 45 | 28 61 87 100 | — — 2.77 2.95 | | |
| 22 | Oil, MCH 4 hours 60° C. | 50 | 4 | 15 min. 30° C. | 3 | 2 hours 60° C. | 300 | 9 30° C. | 11 20 30 45 | 29 63 86 98 | — — 2.83 3.05 | | |
| 23 | Oil, CH 4 hours 60° C. | 50 | 4 | 15 min. 30° C. | 3 | 2 hours 60° C. | 300 | 9 30° C. | 11 20 30 45 | 30 65 89 100 | — — 2.82 2.99 | | |
| 24 | Oil, CH 4 hours 60° C. | 50 | 3.9 | 15 min. 30° C. | 3 | 2 hours 60° C. | 300 | 7 30° C. | 10 20 30 40 | 29 70 89 99 | — — 2.62 2.74 (*) 2.79 (**) | 195000 1.43 | 98.7 |

TABLE III-continued

| | Catalytic system | | | | | | Polymerization | | | | Polybutadienes | |
|---|---|---|---|---|---|---|---|---|---|---|---|---|
| No. | Solvation (solvent/ time/T) | Bd:Nd mol | Al:Nd mol | Alkylation time/T | Cl:Nd mol | Preforming time/T | Nd µMcm | S:M T | Reaction time (min.) | Conv. rate (%) | $\eta_{inh}$ dl/g | Mn (g/mol) Ip (SEC) | Cis-1,4 (%) |
| 25 | Oil, CH 4 hours 60° C. | 50 | 2.8 | 15 min. 30° C. | 3 | 2 hours 60° C. | 420 | 7 30° C. | 5 10 15 20 | 22 53 89.5 98 | — — 2.53 2.65 (*) 2.73 (**) | 181000 1.45 | 98.2 |
| 26 | Oil, CH 4 hours 60° C. | 50 | 1.7 | 15 min. 30° C. | 3 | 2 hours 60° C. | 680 | 7 30° C. | 5 9 13 16.5 | 40.5 80 97 100 | — — 2.75 2.80 (*) 2.98 (**) | 189000 1.60 | 98.5 |
| 27 | CH 4 hours 60° C. | 50 | 4 | 15 min. 30° C. | 3 | 2 hours 60° C. | 300 | 9 30° C. | 11 20 30 45 | 38 72 92 98 | 2.86 3.12 | | |
| 28 | CH 2 hours 60° C. | 50 | 4 | 15 min. 30° C. | 3 | 2 hours 60° C. | 520 520 460 | 7 60° C. 7 60° C. 7 60° C. | 15 15 15 | 100 100 100 | 2.50 2.61 2.58 | | |
| 29 | MCH 30 min 30° C. | 30 | 1.8 | 30 min. 30° C. | 2.6 | 2 hours 60° C. | 2000 | 9 30° C. | 15 | 100 | 2.99 | | |

The inherent viscosity values indicated (*) were "crude" viscosities, i.e. they correspond to the viscosity of the sample together with its residual oil content from the catalytic system.

The inherent viscosity values indicated (**) were viscosities "without oil", i.e. they state the viscosity of the preceding sample once its oil content has been washed out by coagulation in methanol.

The cis-1,4 linkage content shown in Table III were determined by "near infrared" analysis (also abbreviated to "NIR" by the person skilled in the art. (See "Measurements and Tests" below.)

Figure 2:
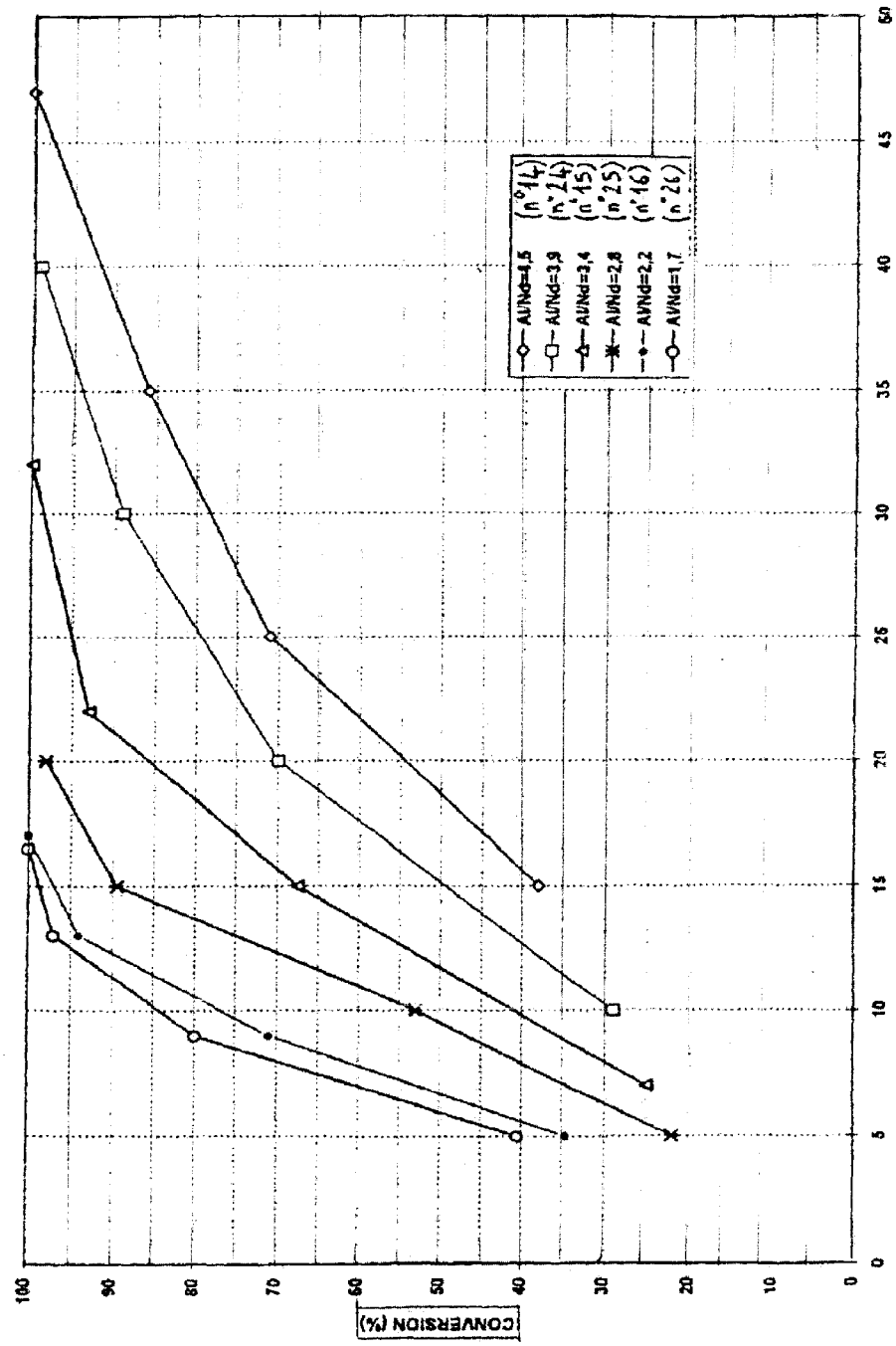
FIG. 2 is a graph illustrating the influence of the "alkylating agent:rare earth salt" molar ratio on the activity of 6 catalytic systems of the invention for the preparation of polyisoprenes exhibiting an inherent viscosity of between 2.6 and 2.8 dl/g.

With regard to the tests performed by means of catalytic systems 28 and 29, the Mooney viscosity ML(1+4) and polydispersity index Ip (measured by SEC) were also measured on the polybutadienes obtained. The results are shown in Table IV:

3) Conclusions:

At a given inherent viscosity of between 2.6 and 2.8 dl/g for the polybutadienes obtained (at substantially 100% conversion), it will be noted that catalytic activity rose when the Al:Nd molar ratio fell, as is shown by FIG. 2, which relates to the preparation of polybutadienes by means of said catalytic systems 14, 15, 16, 24, 25, 26.

It may be seen in FIG. 2 that reducing the Al:Nd ratio from 4.5 to 1.7 allowed a very substantial increase in catalytic activity (tests performed by means of catalytic systems 14 and 26, respectively, where the quantity of Nd was changed from 250 to 680 µmol per 100 g of butadiene in order to obtain a similar viscosity of between 2.6 and 2.8 dl/g).

It will be noted that catalytic system 26, which is characterized by an Al:Nd molar ratio of 1.7, constituted a preferred embodiment of the invention, in that it allowed a

TABLE IV

| No. | Solvation (solvent/ time/T) | Bd:Nd mol | Al:Nd mol | Alkylation time/T | Cl:Nd mol | Performing time/T | Nd µMcm | S:M T | Reaction time (min.) | Conv. rate (%) | $\eta_{inh}$ dl/g | ML (1 + 4) | IP (SEC) |
|---|---|---|---|---|---|---|---|---|---|---|---|---|---|
| 28 | CH 2 hours 60° C. | 50 | 4 | 15 min. 30° C. | 3 | 2 hours 60° C. | 520 520 460 | 7 60° C. 7 60° C. 7 60° C. | 15 15 15 | 100 100 100 | 2.50 2.61 2.58 | 43 50 45 | 1.85 1.92 1.79 |
| 29 | MCH 30 min. 30° C. | 30 | 1.8 | 30 min. 30° C. | 2.6 | 2 hours 60° C. | 2000 | 9 30° C. | 15 | 100 | 2.99 | 59 | 1.86 1.92 1.90 |

The results from these tests show that the catalytic systems according to the invention make it possible to produce polybutadienes which simultaneously exhibit a Mooney viscosity ML(1+4) of greater than 40 and a polydispersity index of below 2, so making them particularly suitable for tire treads.

conversion rate of 100% to be achieved in 16.5 minutes for a polybutadiene exhibiting an inherent viscosity of approximately 2.8 dl/g and a cis-1,4 linkage content of 98.5%.

It will be noted that the reproducibility of the activity of these catalytic systems for polymerizing butadiene was very satisfactory (see in particular the test carried out with catalytic systems 17 and 20, the polybutadienes obtained exhibiting substantially identical macrostructural and microstructural features).

It will also be noted that the polybutadienes obtained by means of these catalytic systems exhibited particularly low polydispersity indices (Ip substantially between 1.40 and 1.80).

The tests performed by means of catalytic systems 21, 22, 23 and 27, which comprised as the aliphatic or alicyclic solvent a mixture of a high molecular weight oil and a low molecular weight solvent, such as cyclohexane or methylcyclohexane, or alternatively only cyclohexane, showed that the nature of the aliphatic or alicyclic solvent associated with the oil to form a gel with the rare earth salt had virtually no impact upon the activity of the catalytic system. Furthermore, the presence or absence of said oil in this solvent caused virtually no change in catalytic activity (see test performed with catalytic system 27).

Measurements and Tests Determination of the Microstructure of the Elastomers

I/For Polyisoprenes:

1) By Carbon 13 Nuclear Magnetic Resonance Analysis ($^{13}$C NMR Analysis):

a) Sample Preparation:

2 g of polyisoprene were extracted in refluxing acetone for 8 hours. The extracted polyisoprene was then dried at ambient temperature under a vacuum for 24 hours. This dried polyisoprene was then redissolved in chloroform. The polyisoprene solution was filtered and the solvent removed in a rotary evaporator for 4 hours (bath temperature is 40° C.).

For the purposes of the analysis, approximately 600 mg the of polyisoprene prepared in this manner were solubilized in CDCl$_3$ (2 ml) directly in a $^{13}$C NMR tube.

b) Characteristics of the Apparatus:

Spectrophotometer sold under the name "BRUKER AM250".

Resonance frequency (SFO)=62.9 MHz.

Pulse program: INVGATE.AU (suppression of "NOE" effect for quantitative analysis of $^{13}$C by NMR).

Pulse duration: 9 µs (90°).

Relaxation time: 10 s.

Cumulative number of scans (NS)=8192.

c) Assignment of Spectrum Peaks:

Peaks were identified following:

Quang Tho Pham, R. Petiaud, H. Waton, M. F. Llauro Darricades, "Proton and NMR Spectra of Polymers", 1991, Penton Press.

d) Integration Method:

No 1,2-structural units detected.

The ratio between 3,4- and 1,4-contents was determined by means of the ethylenic carbons. The content of trans-1,4 and cis-1,4 linkages in the polyisoprene was calculated from the aliphatic carbons.

2) By Mid-Infrared (MIR) Analysis:

a) Sample Preparation:

The polyisoprene as prepared in paragraph 1) above was used for this infrared analysis, while for NMR the sample was extracted with acetone and then dried in an oven.

A polyisoprene solution of exactly 10 g/l in CCl$_4$ was analyzed using a KBr cell with a pathlength of 0.2 mm.

b) Apparatus:

Spectrophotometer sold under the name "BRUKER IFS88".

Recording conditions:
beam opening: maximum;
resolution: 2 cm$^{-1}$;
moving mirror speed: 0.639 cm$^{-1}$;
detector: DTGS;
accumulations: 64 scans;
purge time: 3 min;
spectral window: 4000 to 400 cm.s$^{-1}$;
transmission spectra recorded;
reference: CCl$_4$ solvent.

Spectrum processing:
transfer to microcomputer;
processing with "OPUS" software from "BRUKER".

c) Assignment of Spectrum Peaks:

Spectral studies and the contents of the following documents made it possible to determine the characteristic bands of the various linkage modes:

Y. Tanaka, Y. Takeuchi, M. Kobayashi, H. Tadokoro, *Journal of Polymer Science, Part A-2*, 1971, 9(1), 43–57.

J. P. Kistel, G. Friedman, B. Kaempf, *Bulletin de la Société Chimique de France*, 1967, no. 12.

F. Asssioma, J. Marchal, C. R. *Acad. Sc. Paris, Ser C*, 1968, 266(22), 1563–6 and *Ser D*, 1968, 266(6), 369–72.

T. F. Banigan, A. J. Verbiscar, T. A. Oda, *Rubber Chemistry and Technology*, 1982, 55(2), 407–15.

The 3–4 conformation exhibited two characteristic bands:
a high intensity band at 880 cm$^{-1}$ corresponding to the out-of-plane deformation vibrations (δ C-H) of the terminal hydrogens of the vinyl group (=CH$_2$) and
a band at 3070 cm$^{-1}$ corresponding to the ν C-H stretching of this same group (=CH$_2$).

The cis-1,4 conformation had a characteristic band around 3030 cm$^{-1}$. This band corresponds to the ν C-H stretching vibrations of the =CH group.

The band corresponding to the symmetrical deformation vibrations of the methyl groups (δ CH$_3$) was a complex band incorporating all three conformations. Absorption corresponding to the δ CH$_3$ of the trans-1,4 conformation was at its maximum around 1385 cm$^{-1}$; this was a shoulder of the band.

d) Integration Method:

The cis-3,4 and 1,4 bands were integrated by the tangential area method.

The 1,4-trans absorption maximum was located on the shoulder of the intense δ CH$_3$ band. The most suitable method in this case was to measure the height of the band using the tangent of the δ CH$_3$ band as the baseline.

e) Calibration Curves:

Statement of Beer-Lambert law:

Do(ν or δ)=ε(ν or δ) e c where:

Do(ν or δ)=optical density of the band ν or δ;

ε(ν or δ)=molar extinction coefficient of the analyte responsible for the band ν or δ;

c=molar concentration of the analyte; and e=sample thickness.

Commercial polyisoprenes (sold as "IR305", "NATSYN 2200" and "SKI-3S"), a polyisoprene synthesized in the laboratory (MC78) and natural rubber (NR) were used as standards. Compared at isoconcentration (solutions), the law may thus be written:

Dx=KX where:

Dx=integration value of the band corresponding to structural unit X,

X=content of structural unit X in the rubber (determined by $^{13}$C NMR), and

K=calibration constant.

Calibration curves Dx=f(X) may thus be plotted for each of the structural units.

II/For The Polybutadienes:

"Near infrared" (NIR) analysis was used. This is an indirect method making use of "control" elastomers whose microstructure had been measured by $^{13}$C NMR. The quantitative relationship (Beer-Lambert law) prevailing between the distribution of the monomers in an elastomer and the shape of the elastomer's NIR spectrum was exploited. This method was carried out in two stages:

1) Calibration:

Spectra of the "control" elastomers were acquired.

A mathematical model was constructed which associated a microstructure to a given spectrum using the PLS (partial least squares) regression method, which was based on a factorial analysis of the spectral data. The following two documents provide a thorough description of the theory and practice of this "multi-variant" method of data analysis:

(1) P. GELADI and B. R. KOWALSKI "Partial Least Squares regression: a tutorial", Analytica Chimica Acta, vol. 185, 1–17 (1986).

(2) M. TENENHAUS "La régression PLS-Théorie et pratique" Paris, Editions Technip (1998).

2) Measurement:

The spectrum of the sample was recorded.

The microstructure was calculated.

Determination of the Distribution of Molecular Weights of the Elastomers Obtained by Size Exclusion Chromatography (SEC)

a) Measurement Principle:

SEC (size exclusion chromatography) makes it possible physically to separate macromolecules by their size in the swollen state in columns filled with a porous stationary phase. The macromolecules are separated by their hydrodynamic volume, the bulkiest being eluted first.

Although not an absolute method, SEC does enable an assessment to be made of the molecular weight distribution of a polymer. On the basis of commercially available standards, the various number-average (Mn) and weight-average (Mw) molecular weights may be determined and the polydispersity index calculated (IP=Mw/Mn).

b) Preparation of the Polymer:

The polymer sample was not subjected to any particular treatment prior to analysis, but is simply solubilized in tetrahydrofuran at a concentration of approximately 1 g/l.

c) SEC Analysis:

The apparatus used was a "WATERS model 150C" chromatograph. The elution solvent is tetrahydrofuran, the flow rate 0.7 ml/min, the temperature of the system 35° C. and the duration of analysis 90 min. A set of four columns was used in series, the columns having the commercial names "SHODEX KS807", "WATERS type STYRAGEL HMW7" and two "WATERS STYRAGEL MHW6E".

The volume of polymer sample solution injected was 100 µl. The detector is a "WATERS model RI32X" differential refractometer and the chromatographic data processing software was "WATERS MILLENNIUM" (version 3.00).

I claim:

1. A catalytic system for preparation by polymerization of diene elastomers comprising polyisoprenes and polybutadienes, said system being based on:

a) a conjugated diene monomer, b) an organic phosphoric acid salt of a rare earth metal, c) an alkylating agent consisting of an alkylaluminium of the formula AlR$_3$ or HAlR$_2$, and d) a halogen donor consisting of an alkylaluminium halide, wherein said salt is suspended in at least one inert and saturated aliphatic or alicyclic hydrocarbon solvent and the alkylating agent:rare earth salt molar ratio ranges from 1 to 5.

2. The catalytic system according to claim 1, wherein the salt is a rare earth tris[bis(2-ethylhexyl)phosphate].

3. The catalytic system according to claim 2, wherein the salt is neodymium tris[bis(2-ethylhexyl)phosphate].

4. The catalytic system according to claim 1 wherein the rare earth metal is in a concentration equal to or substantially equal to 0.02 mol/l.

5. The catalytic system according to claim 1 wherein the salt exhibits a mass content of rare earth metal ranging from 12.0 to 13.5%, wherein said mass content is determined both by complexometric back titration with ethylenediaminetetraacetic acid and by inductively-coupled plasma atomic emission spectrometry.

6. The catalytic system according to claim 1 having a halogen donor:salt molar ratio in a value ranging from 2.2 to 3.

7. The catalytic system according to claim 1 having a conjugated diene monomer:salt molar ratio in a value ranging from 25 to 50.

8. The catalytic system according to claim 1 wherein the alkylating agent:rare earth salt molar ratio ranges from 1 to 2.

9. The catalytic system according to claim 8, wherein the alkylating agent:rare earth salt molar ratio is 1.3.

10. The catalytic system according to claim 8, wherein the alkylating agent:rare earth salt molar ratio is 1.7.

11. The catalytic system according to claim 1 wherein the conjugated diene monomer is butadiene.

12. The catalytic system according to claim 1 wherein the alkylating agent is diisobutylaluminium hydride.

13. The catalytic system according to claim 1 wherein the halogen donor is diethylaluminium chloride.

14. A process for the preparation of a catalytic system, said system being based on:

a) a conjugated diene monomer, b) an organic phosphoric acid salt of a rare earth metal, c) an alkylating agent consisting of an alkylaluminium of the formula AlR$_3$ or HAlR$_2$, and d) a halogen donor consisting of an alkylaluminium halide, wherein said salt is suspended in at least one inert and saturated aliphatic or alicyclic hydrocarbon solvent and the alkylating agent:rare earth salt molar ratio ranges from 1 to 5, said process comprising:

(i) preparing a suspension of said salt in said solvent, (ii) adding said conjugated diene monomer to said suspension, (iii) adding said alkylating agent to said suspension comprising said monomer to obtain an alkylated salt, and (iv) adding said halogen donor to said alkylated salt.

15. A process for the preparation of diene elastomers comprising polyisoprenes and polybutadienes comprising reacting a catalytic system in an inert hydrocarbon solvent and in the presence of a conjugated diene to be polymerized, wherein said catalytic system is based on a) a conjugated diene monomer, b) an organic phosphoric acid salt of a rare earth metal, c) an alkylating agent consisting of an alkylaluminium of the formula AlR$_3$ or HAlR$_2$, and d) a halogen donor consisting of an alkylaluminium halide, wherein said salt is suspended in at least one inert and saturated aliphatic or alicyclic hydrocarbon solvent and the alkylating agent:rare earth salt molar ratio ranges from 1 to 5.

16. The process for the preparation of diene elastomers according to claim 15, wherein the process comprises homopolymerizing isoprene in the presence of the catalyitic system at a temperature ranging from 25° C. to 55° C., such that polyisoprenes having a cis-1,4 linkage content, measured both by carbon 13 nuclear magnetic resonance and mid-infrared analysis, within a range of 98.0% to 98.5%, are obtained.

17. The process according to claim 16, wherein the molar ratio of alkylating agent:rare earth salt of the catalytic system is 1.3.

18. The process for the preparation of diene elastomers according to claim 15, wherein the process comprises homopolymerizing or copolymerizing butadiene in the presence of the catalytic system at a temperature ranging from 25° C. to 100° C.:

wherein the molar ratio of the alkylating agent:rare earth salt of the catalytic system ranges from 1 to 5 and the rare earth metal salt exhibits a mass content of rare earth metal ranging from 12.0 to 13.5%, said content being determined both by complexometric back titration with ethylenediaminetetraacetic acid and by inductively-coupled plasma atomic emission spectrometry, such that homopolymers or copolymers of butadiene simultaneously exhibiting a Mooney viscosity ML(1+4) at 100° C. of greater than or equal to 40, measured in accordance with Standard ASTM D 1646, and a polydispersity index of less than 2.5, measured by size exclusion chromatography, are obtained.

19. The process according to claim 18, wherein the molar ratio of the alkylating agent:rare earth salt of the catalytic system is 1.7.

* * * * *